Aug. 21, 1945.  W. B. POHLE  2,383,212

SHANK CONSTRUCTION

Filed Feb. 19, 1944

Inventor
Walter B. Pohle
by Robert S. Outerbridge
his Attorney

Patented Aug. 21, 1945

2,383,212

UNITED STATES PATENT OFFICE 2,383,212

SHANK CONSTRUCTION

Walter B. Pohle, Lynn, Mass.

Application February 19, 1944, Serial No. 523,164

4 Claims. (Cl. 77—71)

The present invention relates to tools and more particularly to the shanks of tools such as drills, end mills, counterbores, reamers, reamer arbors, shanked cutters, and the like.

It is customary for the manufacturers of such tools to supply them with either straight or taper shanks, depending, for examples, upon whether a given shank is to be received by a lathe chuck or by a collet, which takes straight shanks, or by the spindle socket of a drill press, which takes a taper shank. The terms "taper" and "straight" are machine shop parlance for "frusto-conical" and "cylindrical," respectively.

The cutting-edge or working portions of such tools may be identical regardless of whether the shanks be of the taper or straight types, and as a result it will be apparent that for the performing of identical, or identical size, operations on a drill press and on a lathe, for examples, at least two tools of a given size must be on hand, differing only in their shank constructions. This situation necesarily doubles the number of tools which a machine shop must keep in tool inventory, since nearly all machine shops have both lathes and drill presses, and as a consequence the cost of tool inventory is doubled. For a small shop this item of tool cost may be a very important item, but it is also an important item where tool costs run into many thousands of dollars annually, as in larger shops.

It is the principal object of the present invention to minimize tool cost to machine shops by providing a shank construction which is receivable equally well, to give a few examples, by a lathe chuck or by a collet, on the one hand, or by the spindle socket of a drill press, on the other hand.

To the accomplishment of this object and of such others as may hereinafter appear, the various features of the present invention reside in certain constructions, combinations, and arrangements of parts all fully described hereinafter and then set forth in their true scope in the appended claims, possessing advantages which will be readily apparent to those skilled in the art.

The various features of the present invention will be readily understood from reading this specification in the light of the accompanying drawing which illustrates the best forms of the invention at present known to the inventor and in which.

Figure 1:
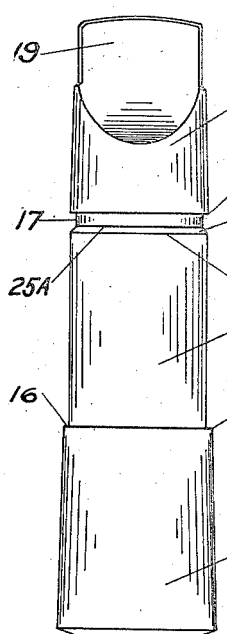
Fig. 1 is an enlarged view in elevation of the shank portion of a drill, the cutting-edge or working portion of the drill being broken away.

With reference to the drawing, there is shown in Fig. 1 the shank portion of a drill, this type of tool being selected merely for purposes of illustration and explanation and not by way of limitation since the shank portion shown may be equally well used for an end mill, counterbore, reamer, reamer arbor, shanked cutter, or the like. The shank portion is provided adjacent one end with a frusto-conical surfaced, or taper, portion 10 and spaced therefrom, and adjacent the cutting-edge or working portion 11, with a second frusto-conical surfaced, or taper, portion 12. The mean diameter of the portion 12 is greater than that of the portion 10, and the two frusto-conical surfaces are surface portions of a cone of revolution and have the same generatrix, circular directrix, and vertex so that the frusto-conical surface of the portion 12 is, in effect, a continuation of the frusto-conical surface of the portion 10, i. e., is on the same taper.

Located between the portions 10 and 12 and coaxial therewith is a cylindrical portion 13 of substantial length the diameter of which is shown in Fig. 1 as slightly larger than the diameter of the larger base or bottom 14 of the portion 10 but smaller than the diameter of the smaller base or top 15 of the portion 12, with which it forms an annular shoulder 16, and located between the top of the cylindrical portion 13 and the lower base or bottom 14 of the portion 10 there is preferably an annular recess 17 the diameter of which is less than that of the base or bottom 14. The top of the cylindrical portion 13 is preferably bevelled, as indicated at 18, and the construction is completed by a tongue or tang 19 at the top of the portion 10, but it is to be understood that this tongue or tang 19 may be omitted since such structure is not found on some taper shanks in commercial use.

The frusto-conical surfaced portions 10 and 12, the cylindrical portion 13, the recessed portion 17, and the cutting-edge or working portion 11 are preferably integral, as is customary in tool manufacture. The diameter of the portion 13 need not be greater than the diameter of the smaller base or bottom 14 of the portion 10, as will be explained, but must be at least equal to said diameter. On the other hand, if the diameter of the portion 13 is greater than that of the smaller base or bottom 14 of the portion 10, and this construction is preferred, the cylindrical diameter must not be great enough to cause any part of the portion 13 to extend beyond or outside any element of an imaginary frusto-conical surface considered as extending between the frusto-conical surfaced portions 10 and 12 and having their generatrix, circular directrix, and vertex.

Figure 2:
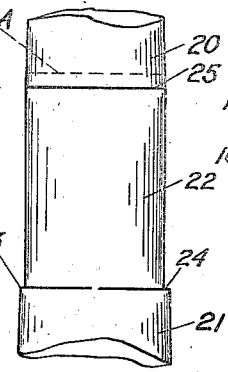
Fig. 2 is an enlarged detail view in elevation, similar to Fig. 1 but showing a modified construction.

A different shank construction is shown in Fig. 2, identical with that shown in Fig. 1 except for being characterized by the absence of the Fig. 1 annular recess 17 and the bevelling 18. This Fig. 2 construction is provided with frusto-conical surfaced portions 20 and 21 the lateral surfaces of which are surface portions of a cone of revolution, have the same generatrix, circular directrix, and vertex, and correspond, respectively, to the frusto-conical surfaced portions 10 and 12 in Fig. 1. The cylindrical portion 22 in Fig. 2 is of substantial length, also corresponds to the cylindrical portion 13 in Fig. 1, is coaxial with the portions 20 and 21, and has a diameter which is less than that of the smaller base or top 23 of the portion 21, forming therewith a shoulder corresponding to the shoulder 16. In view of the absence in Fig. 2, however, of the recess 17 and bevelling 18 shown in Fig. 1, the cylindrical portion 22 merges at its top with the larger base or bottom 25 of the portion 20, so that the diameter of this larger base or bottom 25 and the diameter of the portion 22 are identical, i. e., the diameter of the latter is neither smaller nor greater than that of the former. The mean diameter of the portion 20 is less than that of the portion 21.

The manufacturing of the shank constructions shown in Figs. 1 and 2 may be accomplished in any of several manners. A rough shank may be initially machined or otherwise worked to provide it with a frusto-conical surface throughout its length, and the cylindrical portion 22 (Fig. 2) may be thereafter produced by machining or otherwise coaxial with this frusto-conical surface to provide spaced frusto-conical surfaces such as 20 and 21 in Fig. 2. If desired, the cylindrical portion 22 may be initially machined or otherwise worked on a rough shank, after which further coaxial machining or other working provides the spaced frusto-conical surfaced portions 20 and 21.

If the recess 17 and the bevelling 18 of Fig. 1 are not desired, the Fig. 2 construction may be regarded as an end product so far as formation of the surfaces of the portions 20, 21, and 22 is concerned. If, however, the Fig. 1 construction is desired, and this construction is preferred, the Fig. 2 construction may be regarded as a step product by the further machining or other working of which the Fig. 1 construction may be produced. In this connection it will be understood that the production of the frusto-conical surfaced portion 22 (Fig. 2) is also production of the frusto-conical surfaced portion 12 (Fig. 1) since these two portions are identical, and it should be understood that production of the frusto-conical surfaced portion 20 (Fig. 2) is also production of the surface of the frusto-conical surfaced portion 10.

If the preferable Fig. 1 construction is desired, the Fig. 2 portion 20, produced in either of the manners set forth above, is machined or otherwise worked to form the annular recess 17 (Fig. 1) the bottom of which, in terms of Fig. 2, is the line of merging 25 of the portion 20 with the cylindrical portion 22, which line of merging 25 is represented in Fig. 1 as the location of the line bearing the reference numeral 25A. The top of the recess 17, in terms of Fig. 2, is represented by the construction line 14A, and this construction line 14A is represented in Fig. 1 by the full line 14 which is the larger base or bottom of the portion 10. Stating the foregoing in another way, the Fig. 1 recess 17, the opposite side walls of which are represented by the lines 14 and 25A, is formed by working the portion 20 of Fig. 2 to provide a recess the opposite side walls of which may be regarded as represented by the Fig. 2 lines 14A and 25. It will also be appreciated that the recess 17 may be initially formed on a rough shank, after which, in either of the orders set forth above, there may be produced the frusto-conical surfaced portions 10 and 12 and the cylindrical portion 22, i. e., the cylindrical portion 13 before formation of the bevel surface 18.

The bevel surface 18, having its smaller base or top at 25A and its larger base or bottom at 18A, may be produced upon formation of the recess 17, so that in the finished Fig. 1 construction the cylindrical portion 13 is identical with the Fig. 2 cylindrical portion 22 except that the cylindrical surface of the portion 13, the recess-adjacent end of which is represented by the line 18A, is shorter than the portion 22 by an amount represented by the height of the bevel surface 18, i. e., by an amount equal to the distance between the Fig. 1 lines 25A and 18A.

When only the frusto-conical and cylindrical surfaces of Fig. 2 are formed, the resulting construction automatically and necessarily has the diameter of the portion 22 equal to the diameter of the lower base or bottom 25 of the portion 20, so that the cylindrical portion 22 necessarily touches the frusto-conical surface of the portion 20 along a circle the diameter of which is represented by the line 25.

When, however, the Fig. 1 recess 17 is formed after the production of the frusto-conical and cylindrical portions 20—21 and 22, respectively, of Fig. 2, the diameter of the Fig. 1 cylindrical portion 13 is necessarily greater than that of the larger base or bottom 14 of the portion 10, as is clearly demonstrated in Fig. 2, since the line 14A there (identical in fact with the line 14 in Fig. 1) is necessarily shorter than the line 25, because the line 14A is diametric of the portion 20 at a level where it has a smaller diameter than it has at its larger base or bottom 25. As a consequence, the formation of the recess 17, by reason of causing the Fig. 1 portions 10 and 13 to be spaced, causes the diameter of the portion 13 to be greater than that of the larger base or bottom 14 of the portion 10. The practical and beneficial result of these diameter differences will be demonstrated below in considering Figs. 4 and 5.

But while the formation of the recess 17 produces the diameter differences in Fig. 1 set forth in the paragraph immediately above, if the bevelling 18 of Fig. 1 were not provided, the portion 13 would be identical in length with the Fig. 2 portion 22, and the Fig. 1 line 25A would be as long as the Fig. 2 line 25, with the result that the upper end of the portion 13, while unbevelled, would touch in a circle the above imaginary frusto-conical surface considered as extending between the portions 10 and 12 and having their generatrix, circular directrix, and vertex. When, however, the bevelling 18 is provided, the cylindrical surface of the portion 13 is shortened by an amount equal to the distance between the lines 25A and 18A, with the result that neither at the line 18A in Fig. 1 nor at any point between that line and the shoulder 16 does any part of the portion 13 touch the above imaginary frusto-conical surface. The practical and beneficial result of this construction will be demonstrated below in considering Fig. 3.

If it is not desired to make the Figs. 1 or 2 constructions by a series of machining or working steps, a tool body having a rough shank may be supported and rotated and a forming tool applied to it during continued rotation, the forming tool being adapted to form in one machine operation only the frusto-conical and cylindrical surfaces above-described, or being adapted to form in one machine operation not only these surfaces but also the recess 17, or being adapted to form in one machine operation the Fig. 1 surfaces 10, 12, 13, and also 18 in addition to forming the recess 17.

It will be seen that the above-described Figs. 1 and 2 disclosures, however manufactured, each provide a combined straight and taper shank construction in a single shank, as opposed to a shank which is wholly of the taper type, i. e., is wholly frusto-conical, or which is wholly of the straight type, i. e., is wholly cylindrical. For examples of uses of this combined shank construction, attention is now called to Figs. 3, 4, and 5.

Figure 3:
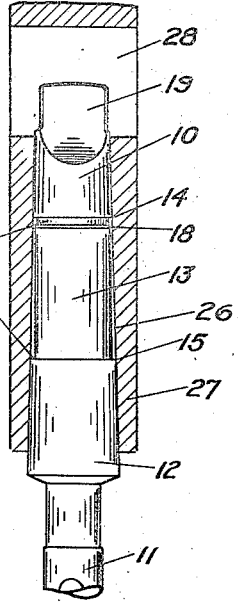
Fig. 3 is a view of the Fig. 1 construction received by the spindle socket of a drill press, the spindle being shown in sectional detail.

In Fig. 3 the shank construction of Fig. 1 is shown received by the taper, i. e., frusto-conical, socket 26 of a drill press spindle 27. The spindle is provided with the usual way 28 which has a driving function and also receives a drift or key (not shown), and the taper of the socket 26 is the same as that of the portions 10 and 12 so that the tool shank as a whole is received in the socket 26 in a proper forced fit in the usual manner and may be drifted therefrom. The cylindrical portion 13 is wholly spaced from the wall of the socket 26 by reason of the bevelling 18, as explained above, and as a consequence the wall of the socket 26 is engaged in the usual manner by the lateral surfaces of the portions 10 and 12 and hence rocking of the shank in the socket is prevented. If the Fig. 2 construction be forced into the socket 26, the cylindrical portion 22 will engage the wall of the socket only in a circle represented by the line of merging (25) with the larger base or bottom of the frusto-conical portion 20, and there will be the same proper forced fit of the portions 20 and 21 as referred to above in connection with the Fig. 1 portions 10 and 12. With either of the Figs. 1 and 2 constructions forced into the socket 26, it will be apparent that the function of the cylindrical portions 13 or 22 is to connect the frusto-conical surfaced portions 10 and 12, or 20 and 21, respectively, and that the tool as a whole may be used in the customary manner.

Figure 4:
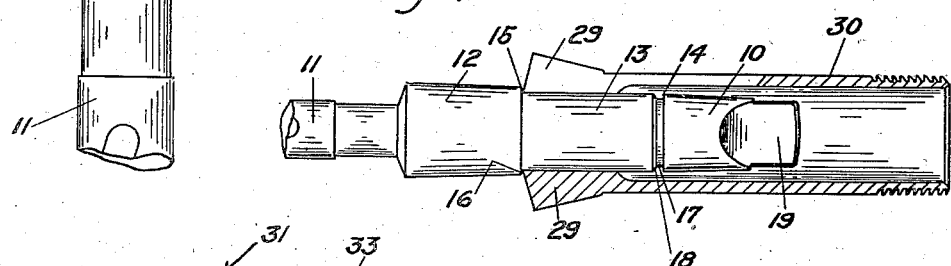
Fig. 4 is a view of the Fig. 1 construction received by a collet, the collet being shown partially in section and with its jaws in the gripping position they assume when the collet is mounted in a lathe stock.

In Fig. 4 the shank construction of Fig. 1 is shown gripped by the jaws 29 of a collet 30, the collet as a whole being shown in the position the jaws assume when mounted in a lathe stock (not shown) and in operative condition. It will be noted that the jaws 29 grip the cylindrical portion 13 and that their front ends abut the shoulder 16, the portion 12 extending forwardly of the jaws and the portion 10 extending rearwardly of the gripping surfaces of the jaws, and not engaging them. Since the portion 10 tapers away from the diameter of the portion 13, i. e., since the diameter of the larger base or bottom 14 of the portion 10 is less than that of the portion 13, as explained above, it will be apparent that the portion 10 would not be engaged by the gripping surfaces of the jaws 29 even if they extended farther rearwardly than shown, and the above considerations would also be true were the Fig. 2 shank construction gripped by the jaws 29 since the portion 20 tapers away from the portion 22. With either of the Figs. 1 and 2 constructions mounted in the jaws 29, however, it will be apparent that the portions 10 or 20 have no function, while the portions 12 or 21 function to connect the portions 13 or 22, respectively, with the cutting-edge or working portion of the tool. With either type of shank construction mounted in the jaws 29, it will be clear that the tool as a whole may be used in the customary manner.

Figure 5:
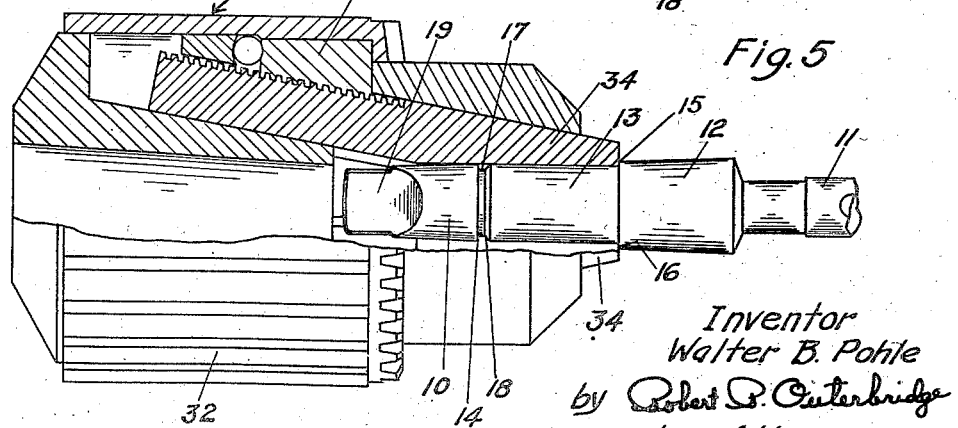
Fig. 5 is a view of the Fig. 1 construction received by a three-jaw chuck, the chuck being shown partially in section to illustrate the gripping of the tool shank by the jaws.

In Fig. 5 the shank construction of Fig. 1 is shown mounted in a lathe chuck 31 the sleeve 32 of which has been rotated to cause the ring gear 33 to move the jaws 34 into clamping engagement with the portion 13 of the shank construction. The jaws 34 abut the shoulder 16 and the portion 12 extends forwardly of the jaws, while the portion 10 extends rearwardly of the gripping surfaces of the jaws in the direction of the hollow of the chuck body. The jaws 34 do not engage the frusto-conical surfaced portion 10 since it tapers away from the diameter of the portion 13, i. e., since the diameter of the larger base or bottom 14 of the portion 10 is less than that of the portion 13, and the above considerations would also be true were the Fig. 2 shank construction gripped by the jaws 34 since the frusto-conical portion 20 tapers away from the cylindrical portion 22. With either of the Figs. 1 and 2 constructions mounted in the jaws 34, however, it will be apparent that the portions 10 or 20 have no function, while the function of the portions 12 or 21 is to connect the cylindrical portions 13 or 22, respectively, with the cutting-edge or working portion of the tool. With either type of shank construction mounted in the jaws 34 it will be clear that the tool as a whole may be used in the customary manner.

The Fig. 2 construction is entirely practicable for use with equipment which is new and clean, but unfortunately under actual operating conditions in machine shops spindle sockets and the jaws of collets and chucks frequently have dirt or other foreign matter on them and if the equipment is old or worn chuck and collet jaws may have gripping surface irregularities—these conditions causing nicking, burring, or other distorting of the shank surfaces which they engage, and consequent danger of a tool shank being out of coaxiality with its machine drive.

The Fig. 1 construction minimizes the danger of this lack of coaxiality. When the recess 17 is provided, so that the diameter of the larger base or bottom 14 of the frusto-conical surfaced portion 10 is less than the diameter of the cylindrical portion 13, there is minimized any chance of dirt or other foreign matter or of surface irregularities on the gripping surfaces of the collet jaws 29

(Fig. 4) if longer than shown, or on the gripping surfaces of the chuck jaws 34 (Fig. 5), engaging the portion 10 at its base or bottom 14 and so distorting it there and thus causing interference with a proper fit of the portions 10 and 12 in a socket such as 26. Stating the foregoing in different words, the formation of the recess 17 causes collet or chuck jaws to clear the portion 10 and thus not injure its surface.

But the Fig. 1 construction also provides a further factor of safety in insuring a proper fit of the portions 10 and 12 in a socket such as 26. Since the bevel surface 18 causes the cylindrical surface of the portion 13 to be shorter than the portion 22, as explained above, so that the recess-adjacent end (18A) of the cylindrical surface of the portion 13 clears, i. e., lies within, the taper of the portions 10 and 12, as also explained above, there is minimized the danger of dirt or other foreign matter on the wall of the socket 26 engaging the portion 13 and thus interfering with a proper fit in the socket 26 of the portions 10 and 12. It may also be pointed out that the bevel surface 18 performs a further safety function since it minimizes the danger of the recess-adjacent end (18A) of the cylindrical surface of the portion 13 being distorted upon being bumped by the mouth of the socket 26, or by the jaws 29 or 34, when the shank is inserted into the Figs. 3, 4, or 5 constructions in a direction that is not substantially axial thereof, with the same possible resultant interference with a proper fit of the portions 10 and 12 in a socket such as 26.

While the shank constructions illustrated in Figs. 1 and 2 have been shown for exemplary purposes as receivable by a drill press spindle socket, a further type of taper socket is that provided by a sleeve or shell drill socket such as is frequently mounted in a lathe stock for the reception of a taper shank tool or chuck. Shank constructions made according to the present invention may be fitted into such sleeves or sockets as well as into the Figs. 4 and 5 constructions, and since the exterior surfaces of such sleeves or shell drill sockets are usually of taper, i. e., of frusto-conical, construction, it will be seen that the combined frusto-conical or taper shank and cylindrical or straight shank features of the present invention may be applied equally well to the exterior surfaces of such sleeves or shell drill sockets, thereby rendering them capable of a wider range of use.

Nothing herein explained is to be interpreted as limiting the present invention, as compared to a particular physical embodiment thereof, in the scope of its application to use in connection with the particular structural details herein selected for purposes of explanation and illustration. The particulars of construction herein set forth are well suited to the particular physical embodiments of the invention which have been shown, but the invention is not limited either to these features conjointly or to these particulars, and it is to be understood that they may be variously modified within the skill of the artisan without departing from the true scope of the actual invention, set forth in the following claims.

What is claimed as new is:

1. A shank construction characterized by two spaced frusto-conical surfaced portions one of which has a larger mean diameter than the other and both of which have the same generatrix, directrix, and vertex, and by a cylindrical portion located between said two spaced portions, the diameter of the cylindrical portion being at least equal to the diameter of the larger base of that spaced portion having the smaller mean diameter and being smaller than the diameter of the smaller base of that spaced portion having the larger mean diameter.

2. A shank construction characterized by two spaced frusto-conical surfaced portions one of which has a larger mean diameter than the other and both of which have the same generatrix, directrix, and vertex, and by a cylindrical portion located between said two spaced portions, the diameter of the cylindrical portion being greater than the diameter of the larger base of that spaced portion having the smaller mean diameter and being smaller than the diameter of the smaller base of that spaced portion having the larger mean diameter, the diameter of the cylindrical portion being not great enough to cause any portion thereof to extend outside any element of an imaginary frusto-conical surface considered as extending between said two spaced portions and having their generatrix, directrix, and vertex.

3. A shank construction such as set forth in claim 2 characterized by the presence of an annular recess located between the cylindrical portion and that spaced portion having the smaller mean diameter.

4. A shank construction such as set forth in claim 2 characterized by the presence of an annular recess located between the cylindrical portion and that spaced portion having the smaller mean diameter and by the presence of a bevelled surface at the end of the cylindrical surface adjacent the recess.

WALTER B. POHLE.